(12) United States Patent
Petrell et al.

(10) Patent No.: US 12,617,341 B1
(45) Date of Patent: May 5, 2026

(54) SYSTEMS AND METHODS FOR CONTEXT-AWARE VISIBILITY IMPROVEMENTS IN LOW-VISIBILITY CONDITIONS

(71) Applicant: Distance Technologies Oy, Helsinki (FI)

(72) Inventors: Joona Petrell, Tampere (FI); Thomas Carlsson, Vantaa (FI)

(73) Assignee: Distance Technologies Oy, Helsinki (FI)

( * ) Notice: Subject to any disclaimer, the term of this patent is extended or adjusted under 35 U.S.C. 154(b) by 0 days.

(21) Appl. No.: 19/220,930

(22) Filed: May 28, 2025

(51) Int. Cl.
| | |
|---|---|
| *B60R 1/24* | (2022.01) |
| *G01C 21/36* | (2006.01) |
| *G06F 3/01* | (2006.01) |
| *G06T 17/00* | (2006.01) |
| *G06T 19/00* | (2011.01) |
| *G06V 10/25* | (2022.01) |
| *G06V 10/60* | (2022.01) |
| *G06V 20/58* | (2022.01) |

(Continued)

(52) U.S. Cl.
CPC ............ *B60R 1/24* (2022.01); *G01C 21/3602* (2013.01); *G06F 3/013* (2013.01); *G06T 17/00* (2013.01); *G06T 19/006* (2013.01); *G06V 10/25* (2022.01); *G06V 10/60* (2022.01); *G06V 20/58* (2022.01); *H04N 7/181* (2013.01); *H04N 23/13* (2023.01); *B60R 2300/105* (2013.01); *B60R 2300/303* (2013.01); *B60R 2300/8053* (2013.01)

(58) Field of Classification Search
CPC ................ B60R 1/24; B60R 2300/105; B60R 2300/303; B60R 2300/8053; G01C 21/3602; G06F 3/013; G06T 17/00; G06T 19/006; G06V 10/25; G06V 10/60; G06V 20/58; H04N 7/181; H04N 23/13
See application file for complete search history.

(56) References Cited

U.S. PATENT DOCUMENTS

| | | | | |
|---|---|---|---|---|
| 6,559,813 | B1 * | 5/2003 | DeLuca | G09G 5/14 |
| | | | | 348/E13.058 |
| 8,054,201 | B2 * | 11/2011 | Okugi | B60R 1/24 |
| | | | | 382/104 |

(Continued)

*Primary Examiner* — Dale W Hilgendorf
(74) *Attorney, Agent, or Firm* — Ziegler IP Law Group, LLC.

(57) ABSTRACT

A system for improving visibility in low-visibility conditions, being implemented in vehicle, including visible-light camera(s); depth camera(s); display unit; optical combiner; and processor(s). Processor configured to: obtain information indicative of relative position of head or eyes of user(s); control visible-light and depth camera(s) to capture, contemporaneously, visible-light and depth images, of region of real-world environment in front of vehicle. For given visible-light image (GVLI), processor identifies in corresponding depth image, image segment(s) that represents object(s) present in region of real-world environment. Processor identifies corresponding image segment(s) in GVLI whose visual information is any one of: occluded, degraded; and generates image by digitally superimposing virtual element(s) on corresponding image segment(s) of GVLI; and displays image via display unit to produce synthetic light field (SLF), optical combiner reflects SLF towards eyes of user(s).

15 Claims, 4 Drawing Sheets

(51) Int. Cl.
  *H04N 7/18*   (2006.01)
  *H04N 23/13*   (2023.01)

(56)           References Cited

U.S. PATENT DOCUMENTS

| | | | | | |
|---|---|---|---|---|---|
| 8,378,851 | B2 * | 2/2013 | Stein | G06F 18/251 | |
| | | | | 382/104 | |
| 8,412,413 | B1 * | 4/2013 | Stark | G02B 27/01 | |
| | | | | 359/13 | |
| 8,798,926 | B2 * | 8/2014 | Stroila | G01C 21/3837 | |
| | | | | 701/451 | |
| 9,963,070 | B2 * | 5/2018 | Ann | B60R 1/24 | |
| 10,607,416 | B2 * | 3/2020 | Nowakowski | G06T 19/006 | |
| 11,394,949 | B2 * | 7/2022 | Chapman | H04N 23/54 | |
| 11,699,250 | B1 * | 7/2023 | McCann | B60K 35/25 | |
| | | | | 345/628 | |
| 2002/0003571 | A1 * | 1/2002 | Schofield | G02B 27/0101 | |
| | | | | 348/148 | |
| 2003/0025799 | A1 * | 2/2003 | Holz | G01S 17/89 | |
| | | | | 348/207.99 | |
| 2007/0030212 | A1 * | 2/2007 | Shibata | G06T 5/50 | |
| | | | | 345/9 | |
| 2007/0053551 | A1 * | 3/2007 | Kubo | G06T 7/269 | |
| | | | | 382/106 | |
| 2009/0140881 | A1 * | 6/2009 | Sakai | G08G 1/164 | |
| | | | | 340/901 | |
| 2009/0237269 | A1 * | 9/2009 | Okugi | G08G 1/166 | |
| | | | | 340/901 | |
| 2010/0321500 | A1 * | 12/2010 | Cornett | G01S 7/4802 | |
| | | | | 382/106 | |
| 2011/0102195 | A1 * | 5/2011 | Kushi | G08G 1/096783 | |
| | | | | 340/905 | |
| 2012/0268262 | A1 * | 10/2012 | Popovic | G02B 27/01 | |
| | | | | 340/438 | |
| 2012/0274745 | A1 * | 11/2012 | Russell | G02B 27/017 | |
| | | | | 348/46 | |
| 2014/0085476 | A1 * | 3/2014 | Toyofuku | G06V 20/58 | |
| | | | | 348/148 | |
| 2019/0161010 | A1 * | 5/2019 | Repale | G02B 27/0101 | |
| 2023/0174091 | A1 * | 6/2023 | Andreetto | B60K 35/23 | |
| | | | | 701/93 | |
| 2023/0213755 | A1 * | 7/2023 | Ollila | G02B 27/0093 | |
| | | | | 348/340 | |
| 2024/0027760 | A1 * | 1/2024 | Beckman | G06F 3/013 | |
| 2025/0093953 | A1 * | 3/2025 | Li | G06T 7/248 | |

* cited by examiner

<u>302</u>
An information indicative of a relative position of a head or eyes of at least one user with respect to a semi-reflective surface of an optical combiner is obtained, the optical combiner being arranged on an optical path of a display unit and on an optical path of a real-world light field of a real-world environment, the real-world light field incoming via a windshield of the vehicle

↓

<u>304</u>
At least one visible-light camera and at least one depth camera are controlled to capture, contemporaneously, a plurality of visible-light images and a plurality of depth images, of a region of the real-world environment that is front of the vehicle, respectively

↓

<u>306</u>
For a given visible-light image from amongst the plurality of visible-light images, at least one image segment is identified in a corresponding depth image from amongst the plurality of depth images, that represents at least one object present in the region of the real-world environment

↓

<u>308</u>
At least one corresponding image segment is identified in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner

↓

<u>310</u>
An image is generated by digitally superimposing at least one virtual element on the at least one corresponding image segment of the given visible-light image

↓

<u>312</u>
The image is displayed via the display unit to produce synthetic light field, wherein the optical combiner is employed to reflect the synthetic light field towards the eyes of the at least one user, whilst optically combining the synthetic light field with the real-world light field

FIG. 3

SYSTEMS AND METHODS FOR CONTEXT-AWARE VISIBILITY IMPROVEMENTS IN LOW-VISIBILITY CONDITIONS

TECHNICAL FIELD

The present disclosure relates to systems for improving visibility in low-visibility conditions. Moreover, the present disclosure relates to methods for improving visibility in low-visibility conditions.

BACKGROUND

Visibility plays an essential role in ensuring safety and situational awareness in various environments, particularly in transportation, navigation, and the like. Clear visibility is essential for a user (for example, a driver, a machine operator, and the like) to perceive their surroundings accurately and respond to potential hazards. However, environmental factors for example, such as snow, frost, rain, fog, haze, mist, smoke, dust, pollen, air pollution, condensed windshield, and other forms of aerosols in air scatter light, making it difficult for the user to detect obstacles, road markings, pedestrians, and the like. Additionally, sudden transitions between bright and dark environments, such as entering a tunnel or moving from daylight to shadowed areas, can cause temporary vision impairment due to a time required for a human eye to adjust to changing light conditions. Such factors significantly increase risk of accidents and reduce the user's ability to operate vehicles or machinery safely.

Conventionally, to address these visibility challenges, several methods have been introduced to enhance the user's ability to see in difficult conditions. For example, vehicles are commonly equipped with headlights and fog lights to improve visibility in low-light environments, while defoggers, wipers, and anti-fog coatings help to maintain a clear windshield by preventing condensation and frost buildup. Polarized sunglasses and visors reduce glare from direct sunlight, thereby improving visual comfort. Additionally, modern automotive systems incorporate infrared and Light Detection and Ranging (LIDAR)-based night vision technologies, which detect obstacles and display them on dashboard screens, providing additional awareness in poor visibility conditions.

However, the aforesaid existing solutions face significant limitations. Firstly, lighting-based technology become ineffective in extreme weather conditions where light is scattered or reflected, thereby reducing contrast instead of improving visibility. Secondly, windshield treatments only address surface obstructions but do not help to detect hidden objects (such as pedestrians, stationary hazards and the like) beyond a given field of view. Thirdly, night vision technology provide useful information but require the user to look away from a road to check a separate display, which can be distracting and impractical in fast-moving situations. Furthermore, these systems do not adapt dynamically to different types of visibility impairments, such as physical obstructions or sudden light changes.

Therefore, in light of the foregoing discussion, there exists a need to overcome the aforementioned drawbacks.

SUMMARY

The aim of the present disclosure is to provide a system and a method for improving visibility for a user in low-visibility conditions of a real-world environment by digitally superimposing virtual elements derived from depth data. The aim of the present disclosure is achieved by a system and a method for improving visibility in low-visibility conditions, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

FIG. 3 illustrates steps of a method for improving visibility in low-visibility conditions, in accordance with an embodiment of the present disclosure.

DETAILED DESCRIPTION OF EMBODIMENTS

Figures 1, 2A:
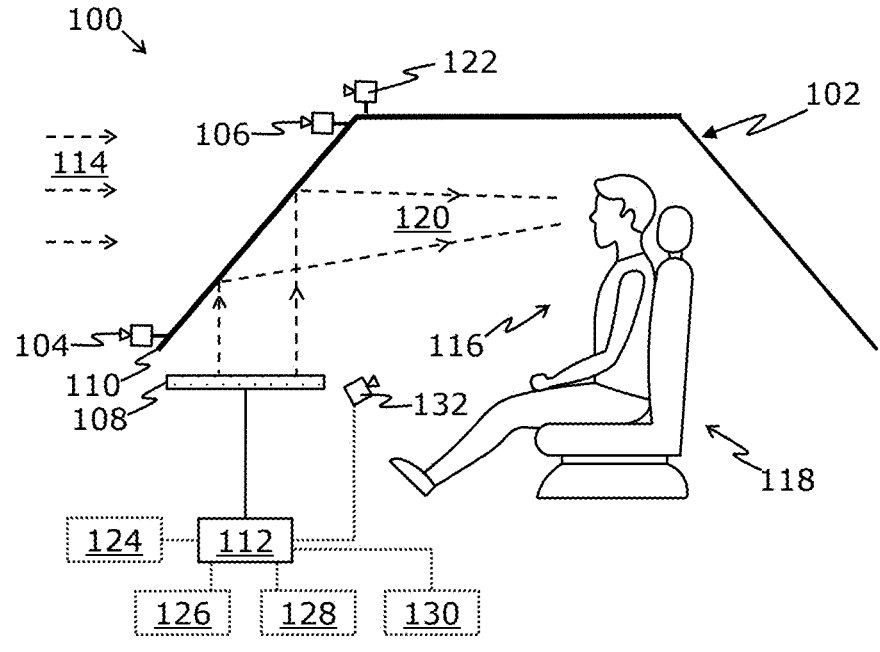
FIG. 1 illustrates a simplified exemplary implementation of a system for improving visibility in low-visibility conditions, in accordance with an embodiment of the present disclosure.
FIG. 2A illustrates an exemplary representation of a region of a real-world environment that is in front of the vehicle, displayed on a windshield of said vehicle.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a system for improving visibility in low-visibility conditions, the system being implemented in a vehicle, the system comprising:

at least one visible-light camera;
    at least one depth camera;
    a display unit;
    an optical combiner arranged on an optical path of the display unit and on an optical path of a real-world light field of a real-world environment, wherein the real-world light field is incoming via a windshield of the vehicle; and
    at least one processor configured to:
        obtain information indicative of a relative position of a head or eyes of at least one user with respect to a semi-reflective surface of the optical combiner;
        control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner; and generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field.

In a second aspect, the present disclosure provides a method for improving visibility in low-visibility conditions, the method being implemented in a vehicle, the method comprising:

obtaining information indicative of a relative position of a head or eyes of at least one user with respect to a semi-reflective surface of an optical combiner, the optical combiner being arranged on an optical path of a display unit and on an optical path of a real-world light field of a real-world environment, the real-world light field incoming via a windshield of the vehicle;

controlling at least one visible-light camera and at least one depth camera to capture, contemporaneously, a plurality of visible-light images and a plurality of depth images, of a region of the real-world environment that is front of the vehicle, respectively;

for a given visible-light image from amongst the plurality of visible-light images, identifying, in a corresponding depth image from amongst the plurality of depth images, at least one image segment that represents at least one object present in the region of the real-world environment;

identifying at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner; and generating an image by digitally superimposing at least one virtual element on the at least one corresponding image segment of the given visible-light image; and displaying the image via the display unit to produce a synthetic light field, wherein the optical combiner is employed to reflect the synthetic light field towards the eyes of the at least one user, whilst optically combining the synthetic light field with the real-world light field.

The present disclosure provides the aforementioned first aspect and the aforementioned second aspect for improving visibility in low-visibility conditions. The system enables generation of the synthetic light field that is spatially aligned with the user's viewpoint. Such an approach ensures that virtual augmentations remain optically coherent and realistically placed in the user's viewpoint, thereby enhancing perceptual accuracy and usability. The system contemporaneously utilizes both the at least one visible-light camera and the at least one depth camera to identify degraded or occluded regions of the real-world environment. This allows for localized image enhancement in real-time, thereby selectively improving visibility without altering an entire field of view. Beneficially, the plurality of depth images are used to accurately identify objects and their spatial positioning relative to the vehicle. Such an approach facilitates reliable detection of obstacles or other vehicles in low-visibility conditions (such as snow, fog, frost, glare, mist, smoke, dust, air pollution, pollen, visual obstruction due to rain, and similar) in real-world environment, thereby supporting enhanced awareness and navigation. It will be appreciated that generating the image by digitally superimposing the at least one virtual element on degraded or occluded segments results in a synthetic light field, which is optically combined with the real-world light field via the optical combiner. This real-time augmentation provides improved situational awareness under low-visibility conditions. It will also be appreciated that the use of the optical combiner to reflect the synthetic light field directly to the user ensures that augmented visual information is presented within the user's forward field of view. Such an approach reduces cognitive load and eliminates the need for the user to divert their gaze to a separate screen, improving safety and user experience during operation of the vehicle.

Unlike conventional visibility enhancement solutions that rely primarily on external lighting, surface-level treatments, night vision technology, the system and method of the present disclosure utilize depth data of the real-world environment from the at least one depth camera to digitally superimpose the at least one virtual element directly within the user's field of view. By dynamically integrating the at least one virtual element based on depth perception, the system and the method provides continuous and context-aware visual guidance, even in conditions where conventional optical approaches fail due to scattering or reflection of light. This ensures that critical environmental information such as presence of obstacles or navigation paths remains perceptible to the user in real time, regardless of low-visibility conditions caused by weather, abrupt lighting transitions, and similar.

Moreover, by implementing the method within the vehicle, said method enables dynamic and context-aware enhancement of visual perception in real time. By obtaining information indicative of the relative position of the user's head or eyes with respect to the optical combiner, the method ensures that subsequent digital augmentation is geometrically aligned with the user's perspective. Such spatial alignment improves fidelity of virtual overlays, thereby enabling more intuitive and accurate perception of augmented visual information. The system and the method reduces reliance on external or secondary displays, lowers the user distraction, and improves decision-making capabilities in low-visibility conditions.

While the system and the method are well-suited for implementation in a Heads-up-display (HUD) (whether a two-dimensional (2D) HUD or a three-dimensional (3D) HUD), it is important to note that their application is not limited to HUDs alone. They can also be adapted for use in other types of display systems. Examples of such display systems include, but are not limited to, augmented-reality (AR) glasses, mixed-reality (MR) headsets, wearable displays (for example, such as smart helmets), waveguide HUDs, and automotive displays (for example, such as rear-view mirror displays).

Throughout the present disclosure, the term "low-visibility condition" of a real-world environment refers to an environmental scenario in which visibility of at least one object within a user's field of view is reduced or impaired due to natural or artificial phenomena. Such conditions may include, but are not limited to, fog, rain, snow, smoke, darkness, low-light environments, shadows, glare, or any combination thereof. The system is designed to enhance visual perception of the real-world environment when natural visibility is compromised. The system forms part of the vehicle infrastructure and operates in real-time while said vehicle is in use. Examples of the vehicle may include, but are not limited to, an, a truck, a bus, a train, an aircraft, and a marine vessel.

Throughout the present disclosure, the at least one visible-light camera utilizes optical lenses and an image sensor, such as a Complementary Metal-Oxide-Semiconductor (CMOS) or Charge-Coupled Device (CCD) sensor, to convert incoming light into digital image data. The captured image data represents a scene with natural colour and brightness, making it suitable for applications such as photogrammetry, spatial mapping, AR, VR, remote visualization, and similar. Examples of such a visible-light camera include, but are not limited to, a Red-Green-Blue (RGB) camera, a Red-Green-Blue-Alpha (RGB-A) camera, a Red-Green-Blue-Depth (RGB-D) camera, a Red-Green-Blue-White (RGBW) camera, a Red-Yellow-Yellow-Blue (RYYB) camera, a Red-Green-Green-Blue (RGGB) camera, a Red-Clear-Clear-Blue (RCCB) camera, a Red-Green-Blue-Infrared (RGB-IR) camera, and a monochrome camera.

Herein, the at least one visible-light camera captures the plurality of visible-light images (i.e., real-time images of a given region) in front of the vehicle. Said images may be synchronized with other sensory inputs, such as depth or thermal data. The at least one processor can then analyse, enhance, or modify the plurality of visible-light images, potentially identifying degraded or occluded regions, and overlaying the at least one virtual element to compensate for missing or unclear information. It will be appreciated that inclusion of the at least one visible-light camera enables the system to generate a photorealistic or a visually consistent synthetic light field that enhances the user's perception in degraded visibility environments. This facilitates augmented vision, improves situational awareness, and supports safe operation of the vehicle. It will also be appreciated that the at least one visible-light camera allows the system to operate under partially visible conditions where full reliance on thermal sensing or depth sensing alone may not be sufficient.

Throughout the present disclosure, the depth camera could be implemented as any one of: a Sound Navigation and Ranging (SONAR) camera, a Radio Detection and Ranging (RADAR) camera, a light detection and ranging (LIDAR) camera, a Time-of-Flight (ToF) camera, a Red-Green-Blue-Depth (RGB-D) camera, a laser rangefinder, a stereo camera, a plenoptic camera, a ranging camera. In an implementation, the at least one depth camera operates to capture the plurality of depth images of the real-world environment in front of the vehicle. In some implementations, the at least one depth camera operates contemporaneously with the visible-light camera to capture the plurality of depth images of the real-world environment in front of the vehicle. These depth images may consist of pixel-wise distance data corresponding to real-world objects. The at least one processor then analyses this depth data to detect objects or regions of interest, including those not clearly visible in the given visible-light image. This analysis supports identification of occluded or degraded image segments in the given visible-light image. It will be appreciated that inclusion of the at least one depth camera enables the system to acquire three-dimensional (3D) spatial information about the real-world environment that is robust against variations in ambient lighting and visibility conditions. Such inclusion allows for reliable detection of objects, terrain features, or obstacles even when they are visually degraded or partially occluded in the visible-light spectrum. This contributes to comprehensive environmental sensing in conditions such as fog, smoke, glare, darkness, rain, and the like. It will also be appreciated that the at least one depth camera facilitates precise geometric alignment of digital augmentations with the physical world by providing dense and accurate pixel-wise depth data for a given scene. This spatial accuracy supports generation of the synthetic light field that maintains consistency with real-world light field, thereby improving visual fidelity, enhancing situational awareness, and promoting safer operation of the vehicle in low-visibility conditions. Herein, the at least one visible-light camera, the at least one depth camera are real-world facing cameras. However, arrangements of these cameras on the vehicle could vary.

In some implementations, the display unit can be implemented as a light field display unit. Pursuant to embodiments of the present disclosure, different types of light field display units can be implemented. For example, the light field display unit can be any one of: a hogel-based light field display unit, a lenticular array based light field display unit, a parallax-barrier based light field display unit. The light field display unit could be implemented as a display with or without a backlight. Examples of the display include, but are not limited to, a Liquid Crystal Display (LCD), a Light-Emitting Diode (LED)-based display, a micro LED-based display, an Organic LED (OLED)-based display, a micro OLED-based display, an Active Matrix OLED (AMOLED)-based display, and a Liquid Crystal on Silicon (LCoS)-based display.

Throughout the present disclosure, the term "optical combiner" refers to a specialized equipment that is capable of reflecting a corresponding part of the synthetic light field towards a given eye of the at least one user, whilst optically combining said part of the synthetic light field with the real-world light field. Optionally, the optical combiner is implemented by way of at least one of: a lens, a mirror, a semi-transparent mirror, a semi-transparent film, a semi-transparent flexible membrane, a prism, a beam splitter, an optical waveguide, a polarizer. Optical combiners are well-known in the art. It will be appreciated that when the at least one user comprises a plurality of users, some users from amongst the plurality of users may directly face the optical combiner (namely, in almost a straight manner), while remaining users may face the optical combiner in a diagonal manner (namely, obliquely or sideways). Optionally, a tilt angle of the optical combiner with respect to an image plane of the display unit lies in a range of 10 degrees and 75 degrees.

Notably, the at least one processor controls an overall operation of the system. The at least one processor is communicably coupled to the at least one visible-light camera, the at least one depth camera, and the display unit. Optionally, the at least one processor is implemented as a processor of the display unit. Alternatively, optionally, the at least one processor is implemented as a processor of a computing device that is communicably coupled to the display unit. Examples of the computing device include, but are not limited to, a laptop, a desktop, a tablet, a phablet, a personal digital assistant, a workstation, and a console. Yet alternatively, optionally, the at least one processor is implemented as a cloud server (namely, a remote server) that provides a cloud computing service.

In some implementations, the relative position of the head or eyes of the at least one user with respect to the semi-reflective surface of the optical combiner is determined based on a typical position of the head or eyes of the at least one user for the system. In this regard, a default, pre-known position may be considered as the typical position of the head or eyes of the at least one user. In other implementations, when the system is implemented as a HUD inside a vehicle, the relative position of the head or eyes of the at least one user with respect to the optical combiner can be determined, based on a current setting of at least one adjustable seat parameter of a seat of the vehicle on which the at least one user is sitting. In this regard, the at least one adjustable seat parameter could comprise at least one of: a position of the seat, an orientation of a backrest of the seat, a height of a lower part of the seat from a floor of the vehicle, an orientation of the lower part of the seat, a position of a neck support of the seat, an orientation of the neck support, a curvature of a lumbar support of the seat. It will be appreciated that the at least one adjustable seat parameter is approximately indicative of a current position of a head of the at least one user inside the vehicle, and thus, could be beneficially utilized for determining the relative position of the eyes of the at least one user with respect to the optical combiner. In yet other implementations, the system may further comprise tracking means, wherein the relative position of the head or eyes of the at least one user with respect to the semi-reflective surface of the optical combiner can be determined by utilising the tracking means. Such tracking means are well-known in the art.

It will be appreciated that the at least one processor is configured to coordinate and manage their operation such that both types of cameras acquire image data of the same real-world scene within same temporal window. To achieve contemporaneous capture, the at least one processor may generate or relay a common trigger signal to both the at least one visible-light camera and the at least one depth camera, instructing each to initiate image acquisition at substantially same moment. Such hardware- or software-based triggering ensures time-aligned acquisition cycles. Moreover, the at least one processor may configure internal frame capture timing parameters for each camera, including a shutter timing, an exposure duration, and a frame rate, to ensure that the plurality of visible-light images and the plurality of depth images correspond to a same scene and moment in time. In some implementations, the at least one processor may maintain synchronization by utilizing a shared timing reference or a clock signal to drive image acquisition cycles of both cameras, thereby minimizing temporal offset between captured frames. The at least one processor may also manage image buffers and associate time-stamps with each captured frame to allow precise temporal pairing of the plurality of visible-light images and the plurality of depth images for further processing. This is particularly useful if small latency differences exist between camera subsystems. By performing above control functions, the at least one processor ensures that the plurality of visible-light images and the plurality of depth images are acquired contemporaneously and from a same region of the real-world environment that is in front of the vehicle. Said region being present in respective fields of view of the at least one visible-light image camera, and the at least one depth camera. This synchronized capture provides the system with temporally and spatially coherent multi-modal data, which is essential for reliable scene understanding, augmented visualization, and safe operation under low-visibility conditions.

Optionally, the at least one visible-light camera and the at least one depth camera are integrated together. In such a case, the at least one visible-light camera and the at least one depth camera are implemented as a single camera (instead of two individual cameras). Moreover, optionally, the at least one processor is configured to estimate depth information (pertaining to the region in front of the vehicle) based on stereo disparity between a stereo pair of visible-light images captured by a pair of visible-light cameras.

Next, for the given visible-light image that represents the region in front of the vehicle, the at least one processor accesses a corresponding depth image that was captured contemporaneously by the at least one depth camera. In this regard, to identify the at least one image segment that represent the at least one object in the real-world environment, the at least one processor is configured to analyse the corresponding depth image amongst the plurality of depth images using one or more depth-based segmentation techniques (e.g., thresholding, edge detection, CNN-based classifiers, and the like). Optionally, the at least one object being one of: a non-occluded object, an occluded object. Optionally, the occluded object is one of: a fully occluded object, a partially occluded object. Optionally, when the at least one object comprises a plurality of objects, some objects from amongst the plurality of objects are non-occluded objects, while remaining objects from amongst the plurality of objects are occluded objects.

Herein, the at least one processor may compute local depth gradients within the corresponding depth image to detect regions where there are abrupt changes in pixel-wise distance values. These discontinuities often correspond to object boundaries in the real-world environment. Moreover, the at least one processor may group spatially contiguous pixels that share similar depth values into segments. Each such segment refers to a distinct spatial region within the corresponding depth image that is identified based on homogeneity in depth values and/or discontinuities in pixel-wise depth measurements. Optionally, the at least one processor may convert depth image pixels into a 3D point cloud using intrinsic calibration parameters of the at least one depth camera. In such a case, a clustering algorithm may be applied in a 3D space to group points corresponding to) same object. Furthermore, in some implementations, the at least one processor may enhance segmentation accuracy by fusing texture or edge data from the corresponding visible-light image, especially when depth resolution is low or noisy. Once segmentation is complete, each identified region is stored as an image segment, which may be represented by a mask, a bounding box, a pixel map, and similar. It will be appreciated that the at least one processor ensures accurate and robust identification of the at least one object present in the region of the real-world environment in front of the vehicle by extracting the at least one image segment from the corresponding depth image using spatial analysis of pixel-wise distance data.

Next, the at least one processor identifies the at least one corresponding image segment in the given visible-light image that may be occluded (i.e., not directly visible due to intervening real-world structures or misalignment with the user's viewpoint through the optical combiner) or degraded (i.e., visible but with low contrast, blur, underexposure, or other visual impairments) based on the image segment already identified in the corresponding depth image as representing the at least one object in the real-world environment. In this regard, the at least one processor may utilize intrinsic calibration parameters and extrinsic calibration parameters (e.g., camera matrix, focal length, distortion coefficients, and the like), to perform a spatial transformation such as a perspective projection to map coordinates of each image segment from the corresponding depth image to a 2D coordinate space of the corresponding visible-light image. Herein, occlusion is identified primarily based on depth information in the corresponding depth image. Specifically, if the corresponding depth image indicates presence of an object at a particular spatial location but the corresponding region in the given visible-light image lacks expected visual information (e.g., is empty, highly obscured, or contains only background texture), the at least one processor infers that the object is occluded in the given visible-light image. This mapping operation may result in identification of at least one corresponding image region in the given visible-light image that is spatially aligned with the at least one image segment in the corresponding depth image. Once the corresponding region is mapped, the at least one processor evaluates quality and visibility of the visual information within that segment of the given visible-light image. Herein, the at least one processor may perform intensity histogram analysis to detect underexposure or overexposure, edge detection and texture analysis to assess whether structural detail is present or missing, focus estimation or blur detection to determine visual degradation, comparison with expected object contours from the corresponding depth image to infer missing or obscured regions. Thus, if the at least one corresponding image segment contains visually ambiguous, low-contrast, blurred, or incomplete visual features, the at least one processor may mark that segment as degraded. Conversely, if the at least one corresponding image segment is largely invisible or absent in the given visible-light image despite being detected in the corresponding depth image, the at least one processor may mark that segment as occluded. A technical effect of such an approach is that it enables robust detection of occluded or visually degraded regions in the given visible-light image by leveraging depth-based spatial context, thereby allowing more accurate interpretation of real-world objects and their visibility status from the user's viewpoint through the optical combiner.

Moreover, the visual information is occluded or degraded due to: various environmental factors, for example, such as fog, mist, smoke, rain, pollution, and the like, presence of condensation, water droplets, snow, frost, dirt or other particles on the windshield, a tunnel entrance, a dark alley, a physical barrier such as a hedge or a vehicle behind which a cyclist is present. Herein, the visual information is understood to be "degraded" when an object is partially visible, namely, hazily or poorly visible to a user. Due to the above-mentioned environmental factors, a visual clarity of the object is reduced, thereby making it visible but not clearly distinguishable to the user.

Optionally, the at least one processor is further configured to identify the at least one corresponding image segment whose visual information is degraded, based further on at least one of: a contrast level, a blur level, a brightness level, a colour desaturation level, of the given corresponding image segment. In this regard, the at least one processor is further configured to identify the at least one corresponding image segment by analysing one or more quantitative visual quality metrics. These metrics are computed for each image segment to assess whether the at least one corresponding image segment exhibits visual degradation. Optionally, the at least one processor may calculate the contrast level within the given corresponding image segment, for example, by evaluating standard deviation of pixel intensity values or using edge detection filters. A low contrast value relative to a predefined contrast threshold indicates a loss of detail or flat illumination, which may result in poor visibility of any overlaid virtual element. Optionally, the at least one processor may evaluate the blur level by measuring spatial frequency content within the given corresponding image segment. Common approaches include computing a Laplacian variance, where a lower variance denotes a higher blur level. An image segment with high blur indicates motion blur or defocus, making it unsuitable for precise superimposition of virtual content. Optionally, the at least one processor may evaluate average luminance or pixel intensity of the at least one corresponding image segment, often in grayscale or value (V) channel of Hue, Saturation Value (HSV) representation. An image segment falling outside a predefined acceptable brightness range (such as too dark or too bright) may be marked as degraded due to poor visibility conditions. Optionally, the at least one processor may assess the colour desaturation by converting the image segment to a suitable colour space and measuring saturation component. Low saturation levels may indicate environmental effects such as fog, low light, and the like, which can impair recognizability and natural appearance of the at least one virtual element.

A technical effect of the aforementioned feature is that visual degradation in image segments can be detected in a content-aware and objective manner, enabling the system to adaptively avoid rendering virtual elements onto low-quality regions. This improves the perceptual integrity, realism, and clarity of the mixed-reality output, while also reducing unnecessary computational load on degraded visual content.

Optionally, the system further comprises at least one thermal imaging camera controlled to capture a plurality of thermal images of the region of the real-world environment that is front of the vehicle, wherein the at least one processor is configured to:

for the given visible-light image, identify, in a corresponding thermal image from amongst the plurality of thermal images, at least one image segment that represents the at least one object present in the region of the real-world environment; and identify the at least one corresponding image segment in the given visible-light image, based further on the at least one image segment that is identified in the corresponding thermal image.

In this regard, term "thermal imaging camera" refers to an imaging device configured to capture electromagnetic radiation in an infrared spectrum, typically within a wavelength range of 8 to 14 micrometers, which is emitted by objects as a function of their temperature. The thermal imaging camera converts detected infrared radiation into an image representing temperature variations across a given scene, wherein warmer objects appear differently than cooler objects. The at least one thermal imaging camera is generally insensitive to visible light and are capable of visualizing heat patterns in environments with low-visibility or no ambient light, such as nighttime, smoke-obscured scenes, fog, snow, and the like. The principle operation of the at least one thermal imaging camera is well-known in the art. The term "thermal image" refers to a two-dimensional array of pixel values generated by the at least one thermal imaging camera, wherein each pixel encodes information about infrared radiation intensity received from a corresponding point in the real-world scene. The pixel values are typically mapped to a grayscale or a false-colour representation to visualize relative temperature differences across the image. The plurality of thermal images enable detection and analysis of heat-emitting objects or thermal anomalies, even under visually degraded or dark conditions, making them useful for surveillance, navigation, object detection applications, and similar.

In an implementation, optionally, the at least one processor is communicably coupled to the at least one thermal imaging camera. Herein, the at least one thermal imaging camera is controlled to capture the plurality of thermal images contemporaneously with the plurality of visible-light images and the plurality of depth images, such that thermal data temporally and spatially corresponds to the visual and depth imagery of the real-world environment in front of the vehicle. The at least one processor analyses said plurality of thermal images that corresponds (temporally or spatially) to the given visible-light image. In this regard, the at least one processor may apply segmentation techniques to identify the at least one image segment representing an object of interest (e.g., a pedestrian, an animal, a vehicle, and the like) based on its heat signature. Once the at least one object is segmented in the corresponding thermal image, the at least one processor may map the identified image segment into a coordinate space of the given visible-light image. This mapping may be based on camera calibration parameters, including intrinsic and extrinsic parameters of both the at least one thermal imaging camera and the at least one visible-light camera, and may further leverage depth information, if available, to enhance geometric accuracy. Additionally, using spatial mapping, the at least one processor is configured to identify the corresponding image segment in the given visible-light image that represents same real-world object identified in the corresponding thermal image.

A technical effect of the aforementioned feature is that the use of thermal image segmentation to guide object identification in the given visible-light image enhances the system's ability to detect real-world objects in low-light or visually degraded conditions, thereby increasing reliability and safety in automotive perception tasks.

Optionally, prior to identifying the at least one image segment in the corresponding depth image, and identifying the at least one corresponding image segment in the given visible-light image, the at least one processor is further configured to:

reproject the corresponding depth image, from a camera pose of the at least one depth camera to a head pose of the at least one user or an eye pose of a given eye of the at least one user; and reproject the given visible-light image, from a camera pose of the at least one visible-light camera to the head pose of the at least one user or the eye pose of the given eye of the at least one user, based on depth information in the corresponding depth image.

A technical effect of this is that it enables viewpoint-consistent alignment of the corresponding depth image and the given visible-light image with the user's actual perspective, thereby enhancing spatial accuracy in identifying and segmenting real-world objects. Such an alignment improves coherence and realism of the at least one virtual element being rendered in the user's visual field, thereby supporting more intuitive and reliable augmented reality experiences.

It will be appreciated that reprojection of the corresponding depth image to the head pose or the eye pose of the at least one user allows the system to achieve viewpoint-consistent spatial alignment, thereby enabling accurate identification and segmentation of real-world objects as seen from the user's perspective. It will also be appreciated that this reprojection facilitates correct parallax and depth correspondence between real and virtual elements, which improves perceptual coherence of augmented reality content when rendered in the user's visual field.

Moreover, it will be appreciated that reprojection of the given visible-light image from the camera pose to the user's head pose or the eye pose ensures view-consistent alignment of visual information, enabling the system to correctly interpret what is visually accessible to the user through the optical combiner. It will also be appreciated that performing such reprojection based on depth information allows for accurate spatial warping of 2D image content, correcting perspective distortions and aligning real-world imagery with the user's actual field of view. It will further be appreciated that this reprojection enables the system to account for occlusions, parallax, and field-of-view limitations from the user's perspective, thereby improving fidelity of object detection, visibility analysis, and virtual content placement. The algorithms required for such reprojection are well-known in the art.

Similarly, optionally, prior to identifying the at least one image segment in the corresponding thermal image, the at least one processor is further configured to:

reproject the corresponding thermal image, from a camera pose of the at least one thermal imaging camera to a head pose of the at least one user or an eye pose of a given eye of the at least one user. A technical effect of this feature is similar to that described with respect to the reprojection of the corresponding depth image and the given visible-light image.

Throughout the present disclosure, the term "image" refers to a digitally generated or acquired two-dimensional visual representation comprising a plurality of pixels arranged in a spatial array, wherein each pixel encodes visual information such as intensity, colour, spectral data, and the like. Herein, the image represents a visual scene as perceivable to the at least one user, potentially through the optical combiner. The term "virtual element" refers to a computer-generated element (namely, a digital object). Examples of the at least one virtual element may include, but are not limited to, a virtual navigation tool, a virtual gadget, a virtual message, a virtual entity, a virtual entertainment media, a virtual vehicle or part thereof, and a virtual information.

After identifying the at least one corresponding image segment in the given visible-light image, the at least one processor generates the image by digitally superimposing the at least one virtual element on the at least one corresponding image segment. The at least one virtual element may be rendered based on a spatial mapping that geometrically aligns the at least one virtual element with identified image segment using calibration data such as intrinsic and extrinsic parameters. The at least one virtual element can be generated as a wireframe outline, a thermal overlay, a 3D silhouette curve, and the like. In this regard, to ensure correct perspective from the user's viewpoint, the at least one processor may render the at least one virtual element using view transformation matrices and a camera projection model that simulate the user's gaze direction and eye position relative to the optical combiner. The rendered virtual content is then digitally blended with the given visible-light image using compositing techniques for example, such as alpha blending, depth-based Z-order control, transparency masking, and similar, to achieve a visually coherent, perceptually aligned, and non-intrusive augmentation.

In one exemplary implementation, the system may include a light field display unit mounted within a vehicle, in conjunction with a 360-degree LIDAR sensor and a forward-facing colour camera. The forward-facing colour camera is configured to capture a visible-light image frames of an environment in front of the vehicle at a frame rate of approximately 30 Hertz (Hz) and at a resolution of HD 1080p. The forward-facing colour camera may operate under automatic exposure settings to dynamically adapt to ambient lighting conditions. Concurrently, the LIDAR sensor may scan the environment at a rate of approximately 20 Hz across 64 channels, generating real-time depth data corresponding to said environment.

The system may be calibrated during manufacturing to align intrinsic and extrinsic parameters of each sensor relative to a heads-up display (HUD), enabling spatial reprojection of sensor outputs into a common reference frame aligned with a user's field of view. During operation, the system may identify a greyish region (referred to as a blob) in the visible-light image that persists across multiple consecutive frames. This greyish region may be determined to be an area of low colour saturation and limited contrast, with relatively stable spatial position across at least three sequential frames. Based on this persistence, the system infers that the blob likely corresponds to an environmental occlusion, such as a smoke plume arising from a fire (e.g., a barbeque fire near a roadside), which is a typical during normal driving conditions.

In this regard, the at least one processor of the system may use then LIDAR data corresponding to the same region to generate a virtual depth-based visualization. This depth visualization may be superimposed digitally onto the identified occluded image segment of the visible-light image in the HUD, creating a synthetic light field that is reflected towards the user via the optical combiner. This superimposed virtual depth content offers the user temporary "X-ray-vision" augmented visibility through occluding smoke, thereby improving situational awareness and enabling more informed driving decisions.

In another scenario, the system may detect a dark and largely featureless region in the at least one visible-light camera feed, which may be expanding across the image space as the vehicle approaches a tunnel. Specifically, the system may identify a contiguous shape occupying more than 5 percent of the total image area, with an average pixel brightness level below a predefined threshold (e.g., below 20 percent on an 8-bit grayscale scale). The region is also detected to maintain a consistent direction of appearance in the field of view across multiple frames, indicating that the vehicle may be heading towards a poorly lit tunnel.

In response, the at least one processor of the system may leverage the LIDAR's 3D point cloud data to retrieve structural details of the tunnel's interior, including any objects or vehicles inside. These details are rendered as virtual depth-based content and digitally superimposed onto the dark and degraded segment of the camera image. This composited image may be presented via the display unit and reflected through the optical combiner into the user's field of view. Such an approach enables improved visibility in low-visibility conditions, allowing the user to perceive key environmental features that would otherwise be obscured due to low ambient light, thereby enhancing safety and spatial perception during tunnel entry.

A technical effect of generating the image by digitally superimposing the at least one virtual element on the at least one corresponding image segment of the given visible-light image is that it enhances perceptibility of real-world objects that are occluded or degraded, thereby improving the user's visual experience and decision-making in real time. Such an approach enables context-sensitive augmentation by ensuring that overlay is accurately aligned with the user's view and real-world geometry, thereby facilitating more intuitive and informative visualization in safety-critical or low-visibility conditions.

Optionally, when identifying the at least one image segment, the at least one processor is further configured to:

process, by utilising a movement filtering technique, the corresponding depth image; and identify the at least one object as a moving object present in the region of the real-world environment, wherein when generating the image, the at least one processor is configured to generate a virtual element corresponding to the moving object.

In this regard, the term "movement filtering technique" refers to a computational method configured to analyse one or more temporally spaced sensor inputs (e.g., depth images or point clouds) to detect motion within a given scene by distinguishing between static and dynamic regions. The movement filtering technique may include, but are not limited to, temporal differencing, optical flow estimation, spatiotemporal filtering, and change detection algorithms. In particular, the movement filtering technique identifies changes in spatial position or depth values of objects across successive frames to isolate moving objects from stationary background elements, while optionally suppressing visual noise or minor fluctuations that do not indicate meaningful movement.

Herein, the at least one processor is further configured to process the corresponding depth image, and optionally, corresponding thermal image (described later) by utilising the movement filtering technique to detect and isolate dynamic elements within the real-world environment. Specifically, the at least one processor obtains a sequence of temporally spaced depth images (e.g., depth frames captured at consecutive time intervals, and similar) and may apply the movement filtering technique to analyse changes in spatial position or depth values over time. The purpose of this operation is to differentiate between static background elements and objects undergoing motion. In this regard, by applying the movement filtering technique, the at least one processor may identify the at least one object in the real-world environment as the moving object, for example, a bicyclist, a jogger, a vehicle and the like. Optionally, when thermal imagery is available, the at least one processor may incorporate temperature-based motion cues or contrast enhancement to improve robustness of the movement filtering technique under poor visibility conditions. Once the moving object is identified, the at least one processor is further configured to generate the virtual element that corresponds to the moving object. The virtual element may visually and/or functionally represent the moving object and is rendered within the synthetic light field generated by the light field display unit. This enables the virtual element to be visually integrated into composited view seen by the at least one user via the optical combiner. In this configuration, the virtual element may serve one or more functions, such as enhancing visibility of the moving object (e.g., outlining, highlighting, augmenting, and the like), providing predictive trajectories (e.g., path indicators for a pedestrian or a vehicle, and the like), displaying warnings or contextual cues (e.g., alerting the at least one user to approaching moving objects, and the like), and similar.

A technical effect of the aforementioned feature is that it enables real-time detection and visual representation of moving objects within a dynamic environment, thereby enhancing situational awareness. This facilitates the real-time augmentation of moving objects with corresponding virtual elements, thereby improving situational awareness, safety, and usability especially in environments where motion cues are critical (e.g., automotive HUDs, AR navigation, smart windshield systems, and the like).

Throughout the present disclosure, the term "synthetic light field" refers to a light field that is produced (namely, generated) synthetically by the light field display unit, while the term "real-world light field" refers to a light field emanating from the real-world environment in which the at least one user is present. It will be appreciated that in case of the real-world light field, light from, for example, a natural light source (such as the Sun) and/or an artificial light source (such as a lamp, a bulb, a tubelight, or similar), are reflected off real-world objects (or their portions) to be incident towards the eyes of the at least one user. In this way, visual information (for example, such as colour information, optical depth information, and the like) pertaining to said real-world objects is typically perceived by the left eye and the right eye. On the other hand, in case of the synthetic light field, light emanating from the light field display unit, upon reflecting off the optical combiner, is incident on the left eye and the right eye of the at least one user. In this way, the visual information pertaining to the at least one virtual element can be perceived by the left eye and the right eye.

After generating the image comprising the at least one virtual elements, the at least one processor is configured to transmit the image data to the display unit. The display unit may be the light field display, which enables the rendering of directional light rays associated with the image. This arrangement causes the display unit to emit the synthetic light field, thereby replicating how light would propagate from a virtual object positioned in physical space. The synthetic light field emitted from the display unit is projected towards the optical combiner, such as a semi-reflective mirror or holographic waveguide. The optical combiner is physically situated within the user's field of view and is optically designed to reflect the synthetic light field toward the eyes of the at least one user, such that each eye receives a distinct directional view (e.g., left-eye and right-eye images), thereby supporting binocular disparity and enabling stereoscopic depth perception. Additionally, the optical combiner is also configured to transmit the real-world light field originating from the user's external environment, thereby functioning as a beam-splitting interface. As a result, the at least one user perceives a composited view that includes both the real-world light field and the reflected synthetic light field. The optical combination is spatially aligned such that the virtual content appears to be integrated into the real-world scene with proper scale, perspective, and depth cues.

It will be appreciated that this approach works well for both 2D display units as well as 3D display units (namely, light field display units). Notably, the aforementioned steps can be performed for each eye of each user, in a case where the at least one user is a plurality of users. Optionally, when it is identified that the visual information represented in the at least one corresponding image segment of the given visible-light image is neither occluded nor degraded, the at least one processor is configured to skip generating the image and displaying the image. In other words, no highlighting for clearly visible objects in the real-world environment.

Optionally, the image is a light field image, and the display unit is a light field display unit comprising a mul-tiscopic optical element configured to direct a first part and a second part of the synthetic light field towards a first eye and a second eye of an individual one of the at least one user, via the optical combiner, presenting a first image and a second image to the first eye and the second eye, respectively, wherein the at least one processor is configured to generate the light field image by utilising the first image and the second image.

In this regard, the light field image is composed of multiple sub-images or views simulating light rays that would originate from different directions. Herein, the at least one processor is configured to generate the first image to the first eye (namely, a left eye), the second image to the second eye (namely, a right eye), based on view-dependent rendering techniques. Such techniques may include, multi-view synthesis or depth-based image rendering technique, a combination of thereof, and are adapted in accordance with the relative positions of the user's eyes with respect to the optical combiner.

The generated first image and the second image collectively form the synthetic light. These images are transmitted through the light field display unit that comprises the mul-tiscopic optical element, for example, such as a lenticular lens array, a parallax barrier, and the like. In this regard, the multiscopic optical element is configured to spatially direct different parts of the light field image (i.e., the first image and the second image) to the corresponding eyes via the optical combiner. The optical combiner is optically arranged to transmit and/or reflect respective directional views such that each eye receives a distinct image, thereby reproducing binocular disparity and enabling naturalistic three-dimensional (3D) depth perception. The at least one processor may utilize calibration data, such as inter-pupillary distance, user head pose, and display geometry parameters, to spatially align the rendered views within a common 3D coordinate system. This ensures that virtual content is perceived with correct depth and positional accuracy from the user's actual viewpoint.

Moreover, in a case where the at least one user comprises a plurality of users, there would be a corresponding pair of a first image and a second image for each of the plurality of users. The light field image may be understood to be a two-dimensional (2D) image comprising a plurality of pixels, wherein the first set of pixels from amongst the plurality of pixels is responsible for generating the first part of the synthetic light field that corresponds to the first eye, and the second set of pixels from amongst the plurality of pixels is responsible for generating the second part of the synthetic light field that corresponds to the second eye. It will be appreciated that the pixels belonging to the first set are not arranged in a continuous manner across the light field image; similarly, the pixels belonging to the second set are also not arranged in a continuous manner across the light field image. Optionally, the pixels belonging to the first set and the pixels belonging to the second set are arranged in alternating vertical stripes across a horizontal field of view of the light field image, wherein each vertical stripe comprises one or more lines of pixels. This is because humans perceive depth mainly based on horizontal binocular parallax. Thus, in this way, the light field image would be considerably different as compared to a conventional 2D image that is displayed via conventional 2D displays, because the same light field image comprises visual information corresponding to the first eye as well as the second eye of the individual one of the at least one user.

A technical effect of generating the light field image by utilising the first image and the second image and presenting them to respective eyes via the multiscopic optical element and the optical combiner is that it enables precise binocular delivery of view-dependent augmented content, thereby allowing realistic depth perception, seamless blending of virtual and real-world scenes, and improved user comfort and immersion without requiring wearable stereoscopic devices.

Optionally, the system further comprises at least one light sensor configured to detect illuminances in sub-regions of the region in the real-world environment, when capturing the given visible-light image and the corresponding depth image, wherein the at least one processor is further configured to identify the at least one corresponding image segment in the given visible-light image, based further on the detected illuminances in the sub-regions of the region in the real-world environment.

In this regard, the term "light sensor" refers to an electronic device configured to detect and measure an intensity of ambient light (illuminance) in one or more sub-regions of the real-world environment. Examples of such light sensor may include, but are not limited to, a photodiode, a phototransistor, a photometric sensor, CMOS or CCD-based imaging sensor operating in photometric mode, and integrated ambient light sensor. Optionally, the at least one light sensor is implemented as at least one of: a directional light sensor, an ambient light sensor, a multi-point light camera, an illumination camera capable of measuring illuminance. Alternatively, optionally, the at least one light sensor is implemented at least one visible-light camera capable of capturing visible-light images, wherein the at least one processor is configured to determine the illuminances in the sub-regions of the region as represented in the visible-light images, by utilising at least one neural network. The principle operation of the at least one light sensor is well-known in the art.

In an implementation, optionally, the at least one processor is communicably coupled to the at least one light sensor. Herein, the at least one light sensor captures illuminance values for multiple sub-regions of the real-world environment that correspond to different portions of the given visible-light image. This detection is synchronized with the capture of the given visible-light image and the corresponding depth image to ensure temporal alignment. In this regard, the at least one processor utilizes detected illuminance values to modify one or more parameters during identification of the at least one corresponding image segment in the given visible-light image. For example, in sub-regions exhibiting low illuminance, the at least one processor may adjust processing thresholds or prioritize spatial continuity to compensate for reduced contrast. When identifying objects in the given visible-light image, particularly those that have already been identified in the corresponding depth image and, optionally, in the corresponding thermal image, the at least one processor uses the illuminance data to resolve ambiguities in regions where visual features are less discernible due to poor lighting conditions.

A technical effect of utilizing the at least one light sensor enables the system to capture spatially-resolved illuminance data across sub-regions of the real-world environment, thereby allowing for more precise identification of the at least one corresponding image segment in the given visible-light image, particularly under varying lighting conditions. It will be appreciated that this capability enhances robustness of object detection in scenarios where visual features may be degraded due to overexposure, underexposure, shadowing, and the like. For example, such an approach enables the system to recognize sub-regions such as tunnel entrances or alleyways that may appear too dark for reliable visual identification by a naked eye.

Optionally, the system further comprises at least one sensor configured to detect the presence of a substance on at least one portion of a surface of the windshield, wherein the at least one processor is further configured to identify the at least one corresponding image segment in the given visible-light image, based on the location of the at least one portion of the surface of the windshield. In this regard, the at least one sensor (for example, an image sensor, a humidity sensor, a temperature sensor, and the like) detects the presence of the substance (for example, condensate, snow, frost, dirt particles, water droplets, and the like) on the at least one portion of the surface of the windshield. In an implementation, optionally, the at least one processor is communicably coupled to the at least one sensor. In this regard, the at least one processor receives sensor data from the at least one sensor that indicates the presence of the substance on the at least one portion of the surface of the windshield. Based on this information, the at least one processor determines which region or sub-region of the given visible-light image corresponds to affected portion of the windshield. The at least one processor then uses this location mapping to identify the at least one corresponding image segment in the given visible-light image. For example, the at least one processor may suppress or adjust interpretation of the at least one corresponding image segment corresponding to a contaminated area, or apply specific processing techniques (such as masking, confidence weighting, segmentation refinement, and the like) to ensure that impact of visual distortion or occlusion introduced by the substance is accounted for during object recognition or visibility analysis. This facilitates accurate segmentation of real-world objects while minimizing influence of environmental artifacts on captured image data.

A technical effect of utilizing the at least one sensor is that the presence and location of obstructive substances on the at least one portion of the surface of the windshield surface, can be accurately detected. Such an approach enables the system to account for visibility degradation when identifying the at least one corresponding image segment in the given visible-light image. As a result, the reliability and robustness of object recognition and scene interpretation under adverse environmental conditions are significantly improved.

Optionally, the at least one processor is further configured to:

obtain a three-dimensional (3D) model of the real-world environment, from a data repository; and generate the at least one virtual element, based on the 3D model of the real-world environment and a current location of the vehicle.

In this regard, the term "three-dimensional model" of the real-world environment refers to a data structure that comprises comprehensive information pertaining to spatial layout, geometry, and topology of physical objects and surfaces in the real-world environment. Such comprehensive information may include, but are not limited to, dimensions, relative positions, and orientations of real-world entities such as roads, buildings, traffic signs, vegetation, and terrain. The 3D model may be generated in the form of a 3D polygonal mesh, a 3D point cloud, a 3D surface cloud, a voxel-based model, or similar. Optionally, the at least one processor is configured to store the 3D model at the data repository that is communicably coupled to the at least one processor. The data repository may be implemented as a memory of the at least one processor, a cloud-based database, or similar.

Herein, the at least one processor is configured to obtain the 3D model corresponding to a geographic area surrounding the current location of the vehicle. In doing so, the at least one processor may access and retrieve only relevant subset of the 3D model data based on the current location of the vehicle, which may be determined using a Global Navigation Satellite System (GNSS) module (e.g., Global Positioning System), inertial navigation system (INS), or other positioning systems. Once relevant portion of the 3D model is obtained, the at least one processor is further configured to generate the at least one virtual element, for example, rendered overlay, graphical guide, navigation marker, and the like, that is contextually relevant to the current vehicle location and direction of travel. The at least one virtual element is generated based on spatial alignment between the current vehicle position and geometry and topology of the surrounding environment as represented in the 3D model. To achieve accurate rendering, the at least one processor may perform coordinate transformation and projection computations to map the 3D world coordinates of the at least one virtual element into a 2D coordinate frame corresponding to the given visible-light image. This mapping ensures that the at least one virtual element appears visually aligned with the real-world environment as perceived by the at least one user.

A technical effect of utilizing the 3D model of the real-world environment in conjunction with the vehicle's current location is that the system can render spatially accurate and context-aware virtual elements. Such an approach improves situational awareness, enhances comprehension, and enables seamless integration of the virtual content with the user's field of view, especially in low-visibility conditions. As a result, safety, navigation accuracy, and the user experience are significantly enhanced.

Optionally, the system further comprises a geospatial navigation device configured to generate real-time navigation information for the vehicle, wherein the at least one processor is further configured to generate the at least one virtual element, based on the real-time navigation information.

In this regard, the term "geospatial navigation device" refers to an electronic device configured to determine and provide real-time geographic positioning and routing information for the vehicle. Examples of the geospatial navigation device may include, but are not limited to, a GNSS receiver (e.g., GPS), and an inertial navigation system (INS). In an implementation, optionally, the at least one processor is communicably coupled to the geospatial navigation device. The geospatial navigation device continuously tracks the vehicle's position, speed, heading, and planned route in real time. This real-time navigation data is transmitted to the at least one processor. In this regard, the at least one processor correlates the navigation data with the 3D model of the environment (if available) and/or the given visible-light image currently being captured. Based on this correlation, the at least one processor generates and places virtual navigation elements (e.g., arrows showing where to turn, lane markings, distance-to-destination labels, speed sign, parking marks, and the like) in appropriate positions aligned with the user's field of view. A technical effect of utilizing the geospatial navigation device is that navigation-related virtual elements can be generated in real time and positioned accurately within the user's visual field. Such an approach enhances route visibility, reduces the user distraction, and improves operational safety in low-visibility conditions.

Optionally, the at least one processor is further configured to:

obtain information indicative of a current weather condition in the real-world environment; and perform the steps of obtaining the information indicative of the relative position, controlling the at least one visible-light camera and the at least one depth camera, identifying the at least one image segment, identifying the at least one corresponding image segment, generating the image, and displaying the image, based on the weather condition in the real-world environment.

In this regard, the at least one processor may obtain the current weather condition from external sources, such as weather data feeds received via network communication, or from onboard environmental sensors. Upon determining prevailing weather condition, the at least one processor is configured to adapt system operations accordingly. To enhance scene understanding, the at least one processor is also configured to adjust image segmentation algorithms to account for visual anomalies introduced by weather phenomena such as blurred object boundaries, reflections, glare, partial occlusions, and the like. Based on adapted sensor data and segmentation output, the at least one processor further modifies generation of the at least one virtual element, for instance by increasing visual contrast, repositioning graphical overlays, filtering out non-essential content to suit visibility constraints, and similar. Then, the at least one processor renders and displays the image in a manner that is dynamically optimized for the current weather condition, thereby ensuring that critical information remains clearly visible and perceptually aligned with the real-world environment.

It will be appreciated that by obtaining the current weather condition and dynamically adjusting the image processing and sensor control parameters accordingly, the system can maintain high-quality perception and accurate augmentation in varying environmental conditions such as rain, fog, snow, and the like. It will also be appreciated that such dynamic adaptation enables the system to preserve visibility and interpretability of critical virtual elements within the user's field of view, thereby enhancing safety, usability, and operational reliability of the system in adverse or rapidly changing weather conditions. A technical effect of the aforementioned feature is that the system can dynamically adapt its sensing, processing, and rendering operations based on real-world weather conditions. This ensures robust environmental awareness, maintains perceptual consistency, and supports accurate augmentation even in degraded visibility scenarios.

Optionally, the system further comprises at least one weather sensor, wherein the at least one processor is further configured to determine the current weather condition in the real-world environment, based on current sensor data collected by at least one weather sensor and at least visual information represented in the given visible-light image, by utilising at least one neural network. In this regard, the at least one weather sensor collects real-time environmental data, for example, moisture level, ambient temperature, wind speed, barometric pressure, airborne particulate concentration (i.e., dust, smoke), precipitation intensity, visibility level, light intensity, and similar. In some implementations, the at least one weather sensor may also detect fog density, ultraviolet (UV) radiation, gas concentrations (for example carbon dioxide, ozone, and the like) to visibility and air clarity. Examples of the at least one weather sensor may include, but are not limited to, an image sensor, a humidity sensor, a temperature sensor, a fog sensor, a smoke sensor, and an air quality sensor.

In an implementation, optionally, the at least one processor is communicably coupled to the at least one weather sensor. In this regard, the at least one processor receives data collected by the at least one weather sensor. Based on this sensor data, the at least one processor is configured to determine the current weather condition in the real-world environment. To enhance robustness, the at least one processor further analyses visual information represented in the given visible-light image to detect visual cues indicative of weather phenomena, such as rain streaks, lens blur, low-contrast regions, light diffusion due to fog, and the like. In this regard, the at least one processor integrates both the sensor data and the visual information as an input to the at least one neural network (e.g., a convolutional neural network, a multi-input deep learning model, and the like) trained to classify or estimate weather conditions. The at least one neural network infers prevailing weather state (e.g., clear, rainy, foggy, snowy, dusty, and similar) by learning correlations environmental between parameters and visual characteristics. The resulting weather condition classification is then used by the at least one processor to adapt subsequent system operations, such as virtual element rendering, thereby ensuring reliable operation under diverse atmospheric conditions.

It will be appreciated that utilizing the at least one weather sensor can autonomously and accurately detect current environmental conditions in real time, without relying solely on external data sources. This enables dynamic adjustment of sensor operations, image processing parameters, and virtual element rendering to maintain optimal performance, visibility, and safety across a wide range of weather scenarios. A technical effect of the aforementioned feature is that the system becomes capable of autonomously detecting and interpreting complex real-world weather conditions by fusing sensor data with visual information through the at least one neural network.

Optionally, the at least one processor is further configured to dynamically adjust at least one of: a brightness, a colour, a contrast, an illuminance, a sharpness, a transparency, of the at least one virtual element, based on at least one of: (i) a current weather condition in the real-world environment, (ii) an optical depth of the at least one object from the eyes of the at least one user.

In this regard, it is to be understood that the at least one processor has received the current weather condition in the real-world environment, for example, via data obtained from external weather feeds. Based on the current weather condition, the at least one processor dynamically adjusts the at least one aforesaid characteristics of the at least one virtual element. For example, if fog may be detected, the at least one processor may increase brightness and contrast of the at least one virtual element to ensure better visibility against a low-contrast background. In low-light conditions, the at least one processor may enhance colour saturation and illuminance to improve perceptual clarity. If a virtual object may overlap with a real object that is far away, the at least one processor may increase transparency of the virtual object to reduce occlusion and preserve depth perception. In this regard, the adjustment may be performed using a predefined mapping of visual characteristics to weather categories, or dynamically via the at least one neural network trained to optimize visibility and legibility of augmented content under various environmental conditions.

The at least one processor may perform these adjustments in real time, enabling responsive adaptation as weather conditions change.

Optionally, the at least one processor is further configured to determine the optical depth of the at least one object in the real-world environment relative to the eyes of the at least one user. This optical depth may be estimated using data received from the at least one depth camera. Optionally, the optical depth may also be computed through triangulation or sensor fusion techniques that correlate image data and user viewpoint. Based on estimated optical depth, the at least one processor is configured to dynamically adjust one or more visual parameters, for example, such as the brightness, the colour, the contrast, the illuminance, the sharpness, the transparency, and the like, of the at least one virtual element. Based on this criterion, a size and/or a location of the at least one virtual element could also be dynamically adjusted. These adjustments are made to ensure perceptual coherence between virtual elements and real-world objects located at different depths, thereby enhancing realism and legibility of augmented content. It will be appreciated that by aligning appearance of the at least one virtual element with depth cues in the environment, the system helps the users interpret relative positions and spatial relationships more naturally, thereby reducing visual confusion or mismatch between virtual and physical layers.

For example, when a virtual element may be intended to appear behind or within close proximity to a distant real-world object, the at least one processor may reduce brightness or increase transparency to simulate depth layering and prevent occlusion of far-field scene elements. Conversely, when a virtual element may be positioned at a closer optical depth relative to the user, the at least one processor may enhance sharpness and contrast to emphasize prominence and immediacy in the field of view. These visual modifications may be driven by depth-aware rendering algorithms or machine learning models trained to optimize visual saliency and depth consistency. Such adjustments are performed in real time, allowing the system to maintain consistent and intuitive depth perception as the user or objects in the environment move.

A technical effect of the aforementioned feature is that the system ensures context-aware visibility, perceptual clarity, and spatial alignment of the virtual content, even in difficult environmental conditions or complex 3D scenes. Such an approach significantly enhances the user safety, reduces visual fatigue, and improves overall usability and operational reliability of the system in both augmented and real-world driving or navigation tasks.

Optionally, the system further comprises a tracker, wherein the at least one processor is further configured to:

determine gaze directions of the eyes of the at least one user, by utilising the tracker;

determine a focus depth at which the at least one user is gazing, based on the gaze directions of the eyes;

detect when a difference between the focus depth and an optical depth at which the at least one virtual element is being presented via the synthetic light field is greater than a predefined threshold difference; and when it is detected that said difference is greater than the predefined threshold difference, skip generating the image and displaying the image.

In this regard, the term "tracker" refers to a specialized equipment for detecting and/or tracking at least a position of a given eye of a given user. Optionally, the at least one processor is communicably coupled to the tracker. Optionally, the tracker is implemented as at least one tracking camera and is communicably coupled to the at least one processor. When different types of images captured by the at least one tracking camera are utilized, the position of the given eye can be determined highly accurately, as results obtained from one type of image can be used to refine results obtained from another type of image. Herein, the different types of images constitute the tracking data collected by the tracker, and may be in the form of at least one of: visible-light images, IR images, depth images. It will be appreciated that the tracker tracks both eyes of the at least one user with a significantly high accuracy and precision, such that an error in determining the relative location may, for example, be minimised to within a tolerance range of approximately (+/−) 8 millimetres.

The focus depth at which the at least one user is gazing can be determined based on an interpupillary distance between the eyes of the at least one user (namely, the first eye and the second eye of the individual one of the at least one user) and a convergence of the gaze directions, using any suitable well-known technique.

The optical depth at which the at least one virtual object is being presented is known, because it correlates with a disparity between the first image and the second image presented to the first eye and the second eye of the at least one user. This optical depth is determined along at least one of the gaze directions. Moreover, in case of multiple virtual objects, the at least one virtual object comprises a virtual object (or its part) that lies in a gaze region of a field of view of the at least one user. In this regard, the gaze region is determined based on the gaze directions of the at least one user.

When the difference between the focus depth and said optical depth is detected to be greater than the predefined threshold difference, it means that the at least one user is not gazing at the at least one virtual element being presented to the at least one user via the synthetic light field. In this regard, the predefine threshold difference can be expressed in terms of a predefined percent of any one of: the focus depth, the optical depth at which the at least one virtual element is being presented. As an example, the predefined percent could lie in a range of 10 percent to 20 percent. Moreover, the predefined threshold difference can be selected depending on a depth of field at the focus depth. Similar to the depth of field (namely, related to focus steps) in a camera, the human eye also focuses sharply in a given depth of field at a given focus depth. As an example, for near-focus, the predefined threshold difference may lie in a range of 10 cm to 30 cm. As another example, for far-focus, the predefined threshold difference may lie in a range of 0.5 metre to 2 metres.

Thus, when it is detected that the at least one user is not gazing at the at least one virtual element, it may be beneficial to skip generating the image and displaying the image. This means that the at least one user is not gazing at the at least one virtual element being presented to the at least one user via the synthetic light field. This allows for saving computational resources. Otherwise, when it is detected that said difference is not greater than the predefined threshold difference, the image can be generated and displayed as explained earlier. In such a case, generating the image and displaying the image may not be required to be skipped.

A technical effect of the aforementioned feature is that generation and display operations of the image are optimized by preventing rendering of the at least one virtual element that are not within the user's focus depth, thereby reducing computational load and power consumption. Such an approach enhances perceptual relevance by prioritizing content aligned with the user's visual attention, thereby improving responsiveness of the system and the user experience.

Optionally, the system further comprises a tracker, wherein the at least one virtual element comprises a plurality of virtual elements, and wherein the at least one processor is further configured to:

determine gaze directions of the eyes of the at least one user, by utilising the tracker;

determine a focus depth at which the at least one user is gazing, based on the gaze directions of the eyes;

detect a difference between the focus depth and an optical depth at which respective ones of the plurality of virtual elements are to be presented via the synthetic light field; and perform digital superimposition of only those virtual elements on the at least one corresponding image segment for which said difference is less than a predefined threshold difference, when generating the image.

A technical effect of this is that instead of displaying all virtual elements, the at least one processor selectively displays only relevant ones, namely, relatively closer the at least one user. Herein, when the difference between the focus depth and the optical depth is detected to be less than the predefined threshold difference, it means that the at least one user is gazing at the at least one virtual element being presented to the at least one user via the synthetic light field. The at least one processor is configured to compare the optical depth of each individual virtual element from the plurality of virtual elements to the computed focus depth. For each virtual element where the difference between the focus depth and the optical depth falls below the predefined threshold difference, the at least one processor performs the digital superimposition of that virtual element onto the corresponding image segment within the image. This ensures that only virtual elements which fall within the user's perceived depth of focus are incorporated into the image displayed to the user. Conversely, the virtual elements for which the difference exceeds the predefined threshold are excluded from rendering or superimposition, thereby preserving perceptual clarity and optimizing computational load.

It will be appreciated that this selective superimposition enhances perceptual coherence and visual comfort for the user, as it ensures that only contextually relevant virtual content is displayed in the user's field of view, thereby avoiding visual clutter and potential cognitive overload.

The present disclosure also relates to the method as described above. Various embodiments and variants disclosed above, with respect to the aforementioned first aspect, apply mutatis mutandis to the method.

Optionally, the method further comprises:

for the given visible-light image, identifying, in a corresponding thermal image from amongst the plurality of thermal images, at least one image segment that represents the at least one object present in the region of the real-world environment; and identifying the at least one corresponding image segment in the given visible-light image, based further on the at least one image segment that is identified in the corresponding thermal image.

Optionally, the method further comprises:

obtaining a three-dimensional (3D) model of the real-world environment, from a data repository; and generating the at least one virtual element, based on the 3D model of the real-world environment and a current location of the vehicle.

Optionally, the method further comprises:

obtaining information indicative of a current weather condition in the real-world environment; and performing the steps of obtaining the information indicative of the relative position, controlling the at least one visible-light camera and the at least one depth camera, identifying the at least one image segment, identifying the at least one corresponding image segment, generating the image, and displaying the image, based on the weather condition in the real-world environment.

Optionally, the method further comprises:

processing, by utilising a movement filtering technique, the corresponding depth image; and identifying the at least one object as a moving object present in the region of the real-world environment, wherein when generating the image, the at least one processor is configured to generate a virtual element corresponding to the moving object.

Optionally, the method further comprises:

determining gaze directions of the eyes of the at least one user, by utilising the tracker;

determining a focus depth at which the at least one user is gazing, based on the gaze directions of the eyes;

detecting when a difference between the focus depth and an optical depth at which the at least one virtual element is being presented via the synthetic light field is greater than a predefined threshold difference; and when it is detected that said difference is greater than the predefined threshold difference, skip generating the image and displaying the image.

Optionally, the method further comprises:

determining gaze directions of the eyes of the at least one user, by utilising the tracker;

determining a focus depth at which the at least one user is gazing, based on the gaze directions of the eyes;

detecting a difference between the focus depth and an optical depth at which respective ones of the plurality of virtual elements are to be presented via the synthetic light field; and performing digital superimposition of only those virtual elements on the at least one corresponding image segment for which said difference is less than a predefined threshold difference, when generating the image.

Optionally, the method further comprises:

reprojecting the corresponding depth image, from a camera pose of the at least one depth camera to a head pose of the at least one user or an eye pose of a given eye of the at least one user; and reprojecting the given visible-light image, from a camera pose of the at least one visible-light camera to the head pose of the at least one user or the eye pose of the given eye of the at least one user, based on depth information in the corresponding depth image.

DETAILED DESCRIPTION OF THE DRAWINGS

Referring to FIG. 1, illustrated is simplified exemplary implementation of a system 100 for improving visibility in low-visibility conditions, in accordance with an embodiment of the present disclosure. Herein, the system 100 is shown to be implemented in a vehicle 102 (for example, such a car). The system 100 comprises at least one visible-light camera (depicted as a visible-light camera 104), at least one depth camera (depicted as a depth camera 106), a display unit 108, an optical combiner 110 and at least one processor (depicted as a processor 112). Herein, the optical combiner 110 is arranged on an optical path of the display unit 108 and on an optical path of a real-world light field 114 of a real-world environment, wherein the real-world light field 114 is incoming via a windshield of the vehicle 102. Herein, the processor 112 is communicably coupled to the visible-light camera 104, the depth camera 106, the display unit 108. A user 116 is also shown to be seated on a seat 118 of the vehicle 102. The processor 112 is configured to perform various operations, as described earlier with respect to the aforementioned first aspect. After performing the necessary steps (as described earlier with respect to the aforementioned first aspect), the processor 112 is configured to display an image via the display unit 108 to produce a synthetic light field 120 (for example, shown using dashed lines with arrows), wherein the optical combiner 110 is employed to reflect the synthetic light 120 field towards the eyes of the user 116, whilst optically combining the synthetic light field 120 with the real-world light field 114. Optionally, the system 100 further comprises at least one thermal imaging camera (depicted as a thermal imaging camera 122), at least one light sensor (depicted as a light sensor 124), at least one sensor (depicted as a sensor 126), a geospatial navigation device 128, at least one weather sensor (depicted as a weather sensor 130), and a tracker 132. Optionally, the processor 112 is communicably coupled to the thermal imaging camera 122, the light sensor 124, the sensor 126, the geospatial navigation device 128, the weather sensor 130, the tracker 132.

FIG. 1 is merely an example, which should not unduly limit the scope of the claims herein. A person skilled in the art will recognize many variations, alternatives, and modifications of embodiments of the present disclosure.

Figure 2B:
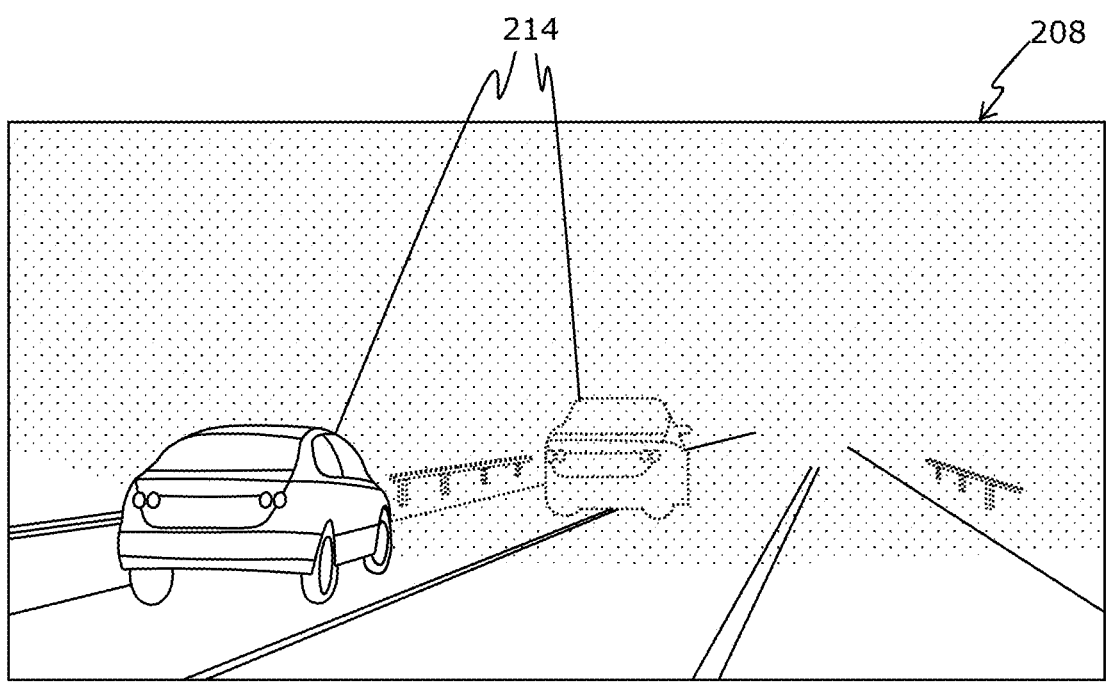
FIG. 2B illustrates exemplary representations of a given visible-light image of said region of the real-world environment that is in front of the vehicle.
Figure 2C:
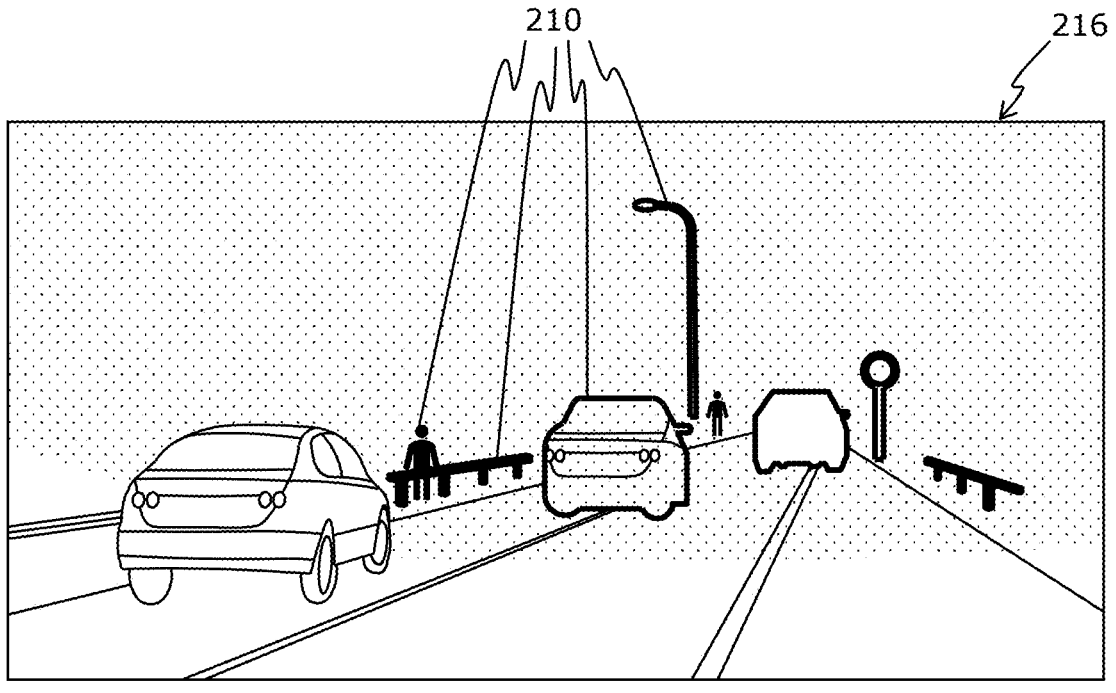
FIGS. 2C-E illustrate different scenarios of a region of a real-world environment, in which at least one virtual element is being digitally superimposed, in accordance with an embodiment of the present disclosure.
Figure 2D:
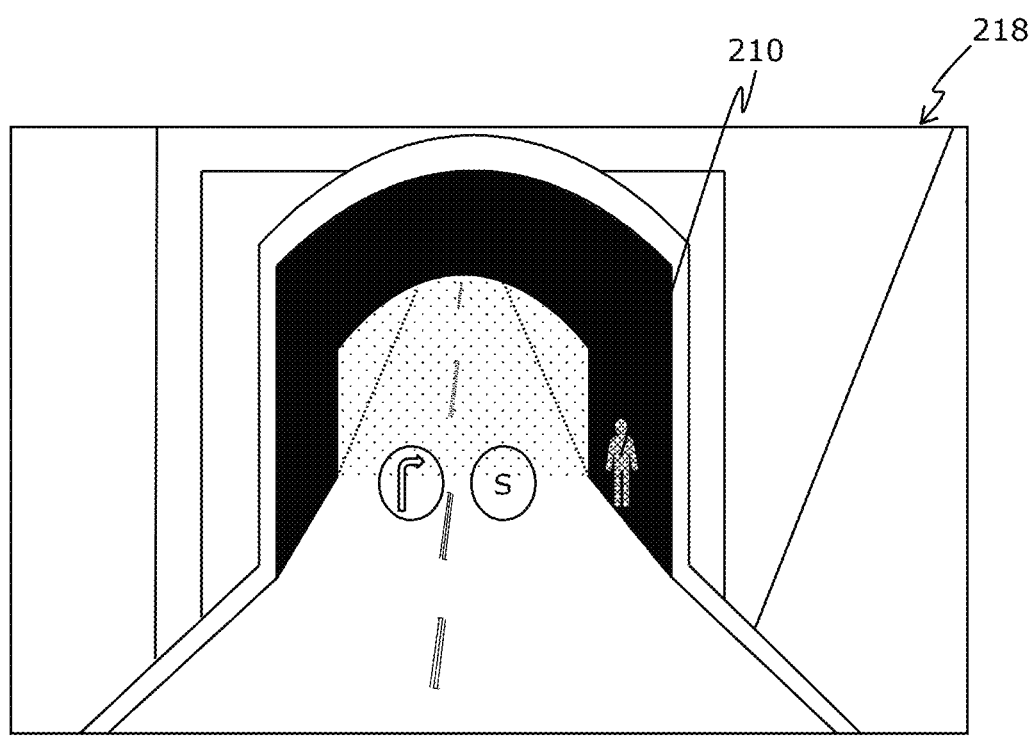
Figure 2E:
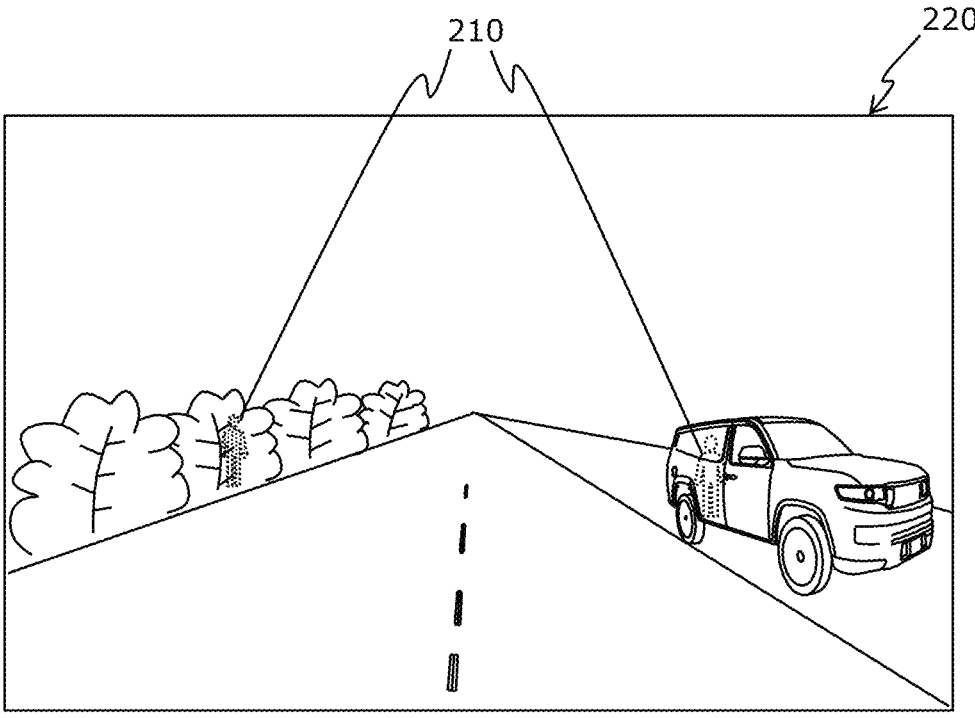

Referring to FIGS. 2A, 2B, 2C, 2D, and 2E, FIG. 2A illustrates an exemplary representation of a region 202 of a real-world environment that is in front of a vehicle 204, displayed on a windshield 206 of said vehicle 204, FIG. 2B illustrates exemplary representations of a given visible-light image 208 of said region 202 of the real-world environment that is in front of the vehicle 204, and FIGS. 2C-E illustrate different scenarios of a region of a real-world environment, in which at least one virtual element (for example, depicted as virtual elements 210) is being digitally superimposed, in accordance with an embodiment of the present disclosure.

In FIGS. 2A-C, there is shown that the real-world environment that is in front of the vehicle 204 is experiencing a low-visibility condition (for example, a foggy environment as shown by dotted hatching pattern).

With reference to FIG. 2A, there is shown that the virtual elements 210 are being digitally superimposed by at least one processor (not shown for the sake of clarity), which are being displayed to a user 212 via the windshield 206 of the vehicle 204.

With reference to FIG. 2B, the given visible-light image 208 represents a two-lane road scene with limited visual clarity due to presence of fog, which results in reduced contrast and desaturation of colour. As shown, at least one object (for example, depicted as objects 214) can be observed in the real-world environment that is in front of the vehicle 204 (as shown in FIG. 2A), although their visual features appear partially occluded or degraded due to prevailing atmospheric conditions. For example, the objects could be a vehicle ahead of a host vehicle, a roadside pedestrian, and similar. Such visual degradation may adversely affect the user's 212 (as shown in FIG. 2A) ability to perceive a given scene accurately through natural vision alone. This figure represents a scenario wherein the at least one processor of a system may identify at least one image segment whose visual information is any one of: occluded, degraded, and initiate digital augmentation of those regions with virtual content derived from at least one depth camera (not shown for the sake of clarity) to enhance situational awareness.

With reference to FIG. 2C, there is shown an exemplary image 216 generated corresponding to the given visible-light image 208, in which the virtual elements 210 are being digitally superimposed by the at least one processor. It is to be understood that visibility of the objects 214 in the given visible-light image 208 is compromised (i.e., partially occluded or degraded). On the other hand, the visibility of the image 216 is being enhanced (i.e., the objects 214 that are partially occluded or degraded in the given-visible light image 208, are now being digitally superimposed in the image 216). Herein, once the given visible-light image 208 is being processed, the at least one processor may utilize corresponding depth data to identify and extract information about the objects 214 (as shown in FIG. 2B) present in the real-world environment. Each identified object is visually segmented and highlighted in the image 216 using overlaid markers and outlines. In this regard, the at least one processor generates the image 216 by digitally superimposing the virtual elements 210 on at least one corresponding image segment of the given visible-light image 208. Then, the at least one processor displays the image 216 via a display unit (not shown for the sake of clarity) to produce a synthetic light field, wherein the windshield 206 is employed to reflect the synthetic light field towards eyes of the user 212 (as shown in FIG. 2A), whilst optically combining the synthetic light field with real-world light field.

With reference to FIG. 2D, there is shown an another exemplary image 218 of a region of a real-world environment that is in front of the vehicle 204 (as shown in FIG. 2A). For example, there is shown a tunnel entrance under low-light conditions, where the surroundings are dimly lit, and detailed features within the tunnel may be difficult to discern. Herein, a person may be positioned inside or near the tunnel, illustrating a potentially obscured object. In this regard, the at least one processor can leverage depth information from the at least one depth camera to generate the virtual element 210 within the tunnel and digitally superimpose onto degraded image region. It will be appreciated that such augmented view is then reflected through the windshield 206 (as shown in FIG. 2A), ensuring that the user 212 (as shown in FIG. 2A) perceives hidden elements with improved clarity and depth awareness, thereby enhancing safety and navigation in low-visibility conditions.

Additionally, in FIG. 2D, there is shown a real-time navigation scenario in which the at least one processor is configured to generate the virtual element 210 based on current navigation information for the vehicle. For example, the user may be presented with multiple augmented indicators such as speed limits, parking signs, and route markers overlaid on a foggy road scene as viewed through the windshield 206 (as shown in FIG. 2A). These virtual elements 210 are generated by the at least one processor in real time, reflecting geospatial and situational data to guide the user 212 (as shown in FIG. 2A) efficiently, particularly under low-visibility conditions.

With reference to FIG. 2E, there is shown yet another exemplary image 220 of a region of a real-world environment that is in front of the vehicle 204 (as shown in FIG. 2A). For example, there is shown a person locating behind a vehicle and would normally remain unseen from the user's 214 (as shown in FIG. 2A) perspective. In this scenario, the at least one processor leverages depth data from the at least one depth camera to determine presence and position of said person behind the vehicle. The at least one processor then digitally superimposes a corresponding virtual outline or silhouette of the virtual elements 210 (i.e., a virtual outline of the person behind the vehicle).

Additionally, in FIG. 2E, there is shown that the at least one processor is configured to generate and project outlines of objects that are partially or fully occluded by surrounding environmental features, such as plants. As shown, the virtual elements 210 is generated based on depth data acquired from the at least one depth camera. These outlines correspond to hidden or semi-hidden objects located behind the plants and may be projected into the user's 212 (as shown in FIG. 2A) field of view via the windshield 206 (as shown in FIG. 2A).

FIGS. 2A-E are merely examples, which should not unduly limit the scope of the claims herein. A person skilled in the art will recognize many variations, alternatives, and modifications of embodiments of the present disclosure.

Referring to FIG. 3, illustrated are steps of a method for improving visibility in low-visibility conditions, the method being implemented in a vehicle, in accordance with an embodiment of the present disclosure. At step 302, an information indicative of a relative position of a head or eyes of at least one user with respect to a semi-reflective surface of an optical combiner is obtained, the optical combiner being arranged on an optical path of a display unit and on an optical path of a real-world light field of a real-world environment, the real-world light field incoming via a windshield of the vehicle. At step 304, at least one visible-light camera and at least one depth camera are controlled to capture, contemporaneously, a plurality of visible-light images and a plurality of depth images, of a region of the real-world environment that is front of the vehicle, respectively. At step 306, for a given visible-light image from amongst the plurality of visible-light images, at least one image segment is identified in a corresponding depth image from amongst the plurality of depth images, that represents at least one object present in the region of the real-world environment. At step 308, at least one corresponding image segment is identified in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner.

At step 310, an image is generated by digitally superimposing at least one virtual element on the at least one corresponding image segment of the given visible-light image. At step 312, the image is displayed via the display unit to produce a synthetic light field, wherein the optical combiner is employed to reflect the synthetic light field towards the eyes of the at least one user, whilst optically combining the synthetic light field with the real-world light field.

The aforementioned steps are only illustrative and other alternatives can also be provided where one or more steps are added, one or more steps are removed, or one or more steps are provided in a different sequence without departing from the scope of the claims herein.

The invention claimed is:

1. A system for improving visibility in low-visibility conditions, the system being implemented in a vehicle, the system comprising:

at least one visible-light camera;

at least one depth camera;

a display unit;

an optical combiner arranged on an optical path of the display unit and on an optical path of a real-world light field of a real-world environment, wherein the real-world light field is incoming via a windshield of the vehicle; and at least one processor configured to:

obtain information indicative of a relative position of a head or eyes of at least one user with respect to a semi-reflective surface of the optical combiner;

control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner; and generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field;

wherein the image is a light field image, and the display unit is a light field display unit comprising a multiscopic optical element configured to direct a first part and a second part of the synthetic light field towards a first eye and a second eye of an individual one of the at least one user, via the optical combiner, presenting a first image and a second image to the first eye and the second eye, respectively, wherein the at least one processor is configured to generate the light field image by utilising the first image and the second image.

2. The system of claim 1, further comprising at least one thermal imaging camera controlled to capture a plurality of thermal images of the region of the real-world environment that is front of the vehicle, wherein the at least one processor is configured to:

for the given visible-light image, identify, in a corresponding thermal image from amongst the plurality of thermal images, at least one image segment that represents the at least one object present in the region of the real-world environment; and identify the at least one corresponding image segment in the given visible-light image, based further on the at least one image segment that is identified in the corresponding thermal image.

3. The system of claim 1, further comprising at least one light sensor configured to detect illuminances in sub-regions of the region in the real-world environment, when capturing the given visible-light image and the corresponding depth image, wherein the at least one processor is further configured to identify the at least one corresponding image segment in the given visible-light image, based further on the detected illuminances in the sub-regions of the region in the real-world environment.

4. The system of claim 1, further comprising at least one sensor configured to detect the presence of a substance on at least one portion of a surface of the windshield, wherein the at least one processor is further configured to identify the at least one corresponding image segment in the given visible-light image, based on the location of the at least one portion of the surface of the windshield.

5. The system of claim 1, wherein the at least one processor is further configured to:

obtain a three-dimensional (3D) model of the real-world environment, from a data repository; and environment and a current location of the vehicle.

6. The system of claim 1, further comprising a geospatial navigation device configured to generate real-time navigation information for the vehicle, wherein the at least one processor is further configured to generate the at least one virtual element, based on the real-time navigation information.

7. The system of claim 1, wherein the at least one processor is further configured to:

obtain information indicative of a current weather condition in the real-world environment; and perform the steps of obtaining the information indicative of the relative position, controlling the at least one visible-light camera and the at least one depth camera, identifying the at least one image segment, identifying the at least one corresponding image segment, generating the image, and displaying the image, based on the weather condition in the real-world environment.

8. The system of claim 7, further comprising at least one weather sensor, wherein the at least one processor is further configured to determine the current weather condition in the real-world environment, based on current sensor data collected by at least one weather sensor and at least visual information represented in the given visible-light image, by utilising at least one neural network.

9. The system of claim 1, wherein the at least one processor is further configured to dynamically adjust at least one of: a brightness, a colour, a contrast, an illuminance, a sharpness, a transparency, of the at least one virtual element, based on at least one of: (i) a current weather condition in the real-world environment, (ii) an optical depth of the at least one object from the eyes of the at least one user.

10. The system of claim 1, wherein the at least one processor is further configured to identify the at least one corresponding image segment whose visual information is degraded, based further on at least one of: a contrast level, a blur level, a brightness level, a colour desaturation level, of the given corresponding image segment.

11. A system for improving visibility in low-visibility conditions, the system being implemented in a vehicle, the system comprising:

at least one visible-light camera;

at least one depth camera;

a display unit;

an optical combiner arranged on an optical path of the display unit and on an optical path of a real-world light field of a real-world environment, wherein the real-world light field is incoming via a windshield of the vehicle; and at least one processor configured to:

obtain information indicative of a relative position of a head or eyes of at least one user with respect to a semi-reflective surface of the optical combiner;

control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner;

generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field;

wherein when identifying the at least one image segment, the at least one processor is further configured to:

process, by utilising a movement filtering technique, the corresponding depth image; and identify the at least one object as a moving object present in the region of the real-world environment, wherein when generating the image, the at least one processor is configured to generate a virtual element corresponding to the moving object.

12. A system for improving visibility in low-visibility conditions, the system being implemented in a vehicle, the system comprising:

at least one visible-light camera;

at least one depth camera;

a display unit;

an optical combiner arranged on an optical path of the display unit and on an optical path of a real-world light field of a real-world environment, wherein the real-world light field is incoming via a windshield of the vehicle; and at least one processor configured to:

obtain information indicative of a relative position of a head or eyes of at least one user with respect to a semi-reflective surface of the optical combiner;

control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner; and generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field;

the system further comprising a tracker, wherein the at least one processor is further configured to:

determine gaze directions of the eyes of the at least one user, by utilising the tracker;

determine a focus depth at which the at least one user is gazing, based on the gaze directions of the eyes;

detect when a difference between the focus depth and an optical depth at which the at least one virtual element is being presented via the synthetic light field is greater than a predefined threshold difference; and when it is detected that said difference is greater than the predefined threshold difference, skip generating the image and displaying the image.

13. A system for improving visibility in low-visibility conditions, the system being implemented in a vehicle, the system comprising:

at least one visible-light camera;

at least one depth camera;

a display unit;

an optical combiner arranged on an optical path of the display unit and on an optical path of a real-world light field of a real-world environment, wherein the real-world light field is incoming via a windshield of the vehicle; and at least one processor configured to:

obtain information indicative of a relative position of a head or eyes of at least one user with respect to a semi-reflective surface of the optical combiner;

control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner;

generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field;

the system further comprising a tracker, wherein the at least one virtual element comprises a plurality of virtual elements, and wherein the at least one processor is further configured to:

determine gaze directions of the eyes of the at least one user, by utilising the tracker;

determine a focus depth at which the at least one user is gazing, based on the gaze directions of the eyes;

detect a difference between the focus depth and an optical depth at which respective ones of the plurality of virtual elements are to be presented via the synthetic light field; and perform digital superimposition of only those virtual elements on the at least one corresponding image segment for which said difference is less than a predefined threshold difference, when generating the image.

14. A system for improving visibility in low-visibility conditions, the system being implemented in a vehicle, the system comprising:

at least one visible-light camera;

at least one depth camera;

a display unit;

an optical combiner arranged on an optical path of the display unit and on an optical path of a real-world light field of a real-world environment, wherein the real-world light field is incoming via a windshield of the vehicle; and at least one processor configured to:

obtain information indicative of a relative position of a head or eyes of at least one user with respect to a semi-reflective surface of the optical combiner;

control the at least one visible-light camera and the at least one depth camera to capture, contemporaneously, a plurality of visible-light images and a plurality of depth images, of a region of the real-world environment that is front of the vehicle, respectively;

for a given visible-light image from amongst the plurality of visible-light images, identify, in a corresponding depth image from amongst the plurality of depth images, at least one image segment that represents at least one object present in the region of the real-world environment;

identify at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner;

generate an image by digitally superimposing at least one virtual element on the at least one corresponding image segment of the given visible-light image; and display the image via the display unit to produce a synthetic light field, wherein the optical combiner is employed to reflect the synthetic light field towards the eyes of the at least one user, whilst optically combining the synthetic light field with the real-world light field;

wherein prior to identifying the at least one image segment in the corresponding depth image, and identifying the at least one corresponding image segment in the given visible-light image, the at least one processor is further configured to:

reproject the corresponding depth image, from a camera pose of the at least one depth camera to a head pose of the at least one user or an eye pose of a given eye of the at least one user; and reproject the given visible-light image, from a camera pose of the at least one visible-light camera to the head pose of the at least one user or the eye pose of the given eye of the at least one user, based on depth information in the corresponding depth image.

15. A method for improving visibility in low-visibility conditions, the method being implemented in a vehicle, the method comprising:

obtaining information indicative of a relative position of a head or eyes of at least one user with respect to a semi-reflective surface of an optical combiner, the optical combiner being arranged on an optical path of a display unit and on an optical path of a real-world light field of a real-world environment, the real-world light field incoming via a windshield of the vehicle;

controlling at least one visible-light camera and at least one depth camera to capture, contemporaneously, a plurality of visible-light images and a plurality of depth images, of a region of the real-world environment that is front of the vehicle, respectively;

for a given visible-light image from amongst the plurality of visible-light images, identifying, in a corresponding depth image from amongst the plurality of depth images, at least one image segment that represents at least one object present in the region of the real-world environment;

identifying at least one corresponding image segment in the given visible-light image whose visual information is any one of: occluded, degraded, based on: (i) the at least one image segment that is identified in the corresponding depth image, and (ii) the relative position of the head or the eyes of the at least one user with respect to the semi-reflective surface of the optical combiner; and generating an image by digitally superimposing at least one virtual element on the at least one corresponding image segment of the given visible-light image; and displaying the image via the display unit to produce a synthetic light field, wherein the optical combiner is employed to reflect the synthetic light field towards the eyes of the at least one user, whilst optically combining the synthetic light field with the real-world light field;

wherein the image is a light field image, and the display unit is a light field display unit comprising a multiscopic optical element configured to direct a first part and a second part of the synthetic light field towards a first eye and a second eye of an individual one of the at least one user, via the optical combiner, presenting a first image and a second image to the first eye and the second eye, respectively, and the light field image is generated by utilising the first image and the second image.

* * * * *